US011022990B2

(12) United States Patent
Van Der Spek et al.

(10) Patent No.: US 11,022,990 B2
(45) Date of Patent: *Jun. 1, 2021

(54) DETERMINING SHEAR RATE AND/OR SHEAR STRESS FROM SONAR BASED VELOCITY PROFILES AND DIFFERENTIAL PRESSURE

(71) Applicants: CiDRA Corporate Services LLC, Wallingford, CT (US); SUNCOR Energy Inc., Calgary (CA)

(72) Inventors: Alex M. Van Der Spek, Rotterdam (NL); Adrian Revington, Calgary (CA)

(73) Assignees: CiDRA Corporate Services LLC, Wallingford, CT (US); SUNCOR Energy Inc., Calgary (CA)

( * ) Notice: Subject to any disclaimer, the term of this patent is extended or adjusted under 35 U.S.C. 154(b) by 73 days.

This patent is subject to a terminal disclaimer.

(21) Appl. No.: 16/265,102

(22) Filed: Feb. 1, 2019

(65) Prior Publication Data

US 2019/0163218 A1 May 30, 2019

Related U.S. Application Data

(62) Division of application No. 13/255,416, filed as application No. PCT/US2010/026744 on Mar. 10, 2010, now Pat. No. 10,216,204.

(Continued)

(51) Int. Cl.
*G05D 11/13* (2006.01)
*G05D 24/00* (2006.01)
(Continued)

(52) U.S. Cl.
CPC .......... *G05D 24/02* (2013.01); *G05D 11/136* (2013.01); *G05D 11/139* (2013.01); *G05D 24/00* (2013.01); *G01F 1/66* (2013.01); *G01F 1/663* (2013.01); *G05D 11/12* (2013.01); *Y10T 137/0318* (2015.04); *Y10T 137/87571* (2015.04)

(58) Field of Classification Search
CPC .... G05D 11/139; G05D 11/136; G05D 11/12; G05D 24/00; G05D 24/02; G01F 1/66; G01F 1/663
See application file for complete search history.

(56) References Cited

U.S. PATENT DOCUMENTS 4,420,008 A ‡ 12/1983 Shu ........................... F17D 1/16
137/4
4,982,756 A * 1/1991 Scribner .................. C09K 3/00
137/13

(Continued)

OTHER PUBLICATIONS

Form PCT/ISA/210 (Second Sheet)(Jul. 2009) of the ISR dated May 13, 2010 for PCT/US2010/026744.‡

*Primary Examiner* — Hailey K. Do
(74) *Attorney, Agent, or Firm* — Ware, Fressola, Maguire & Barber LLP

(57) ABSTRACT

The present invention provides a new method and apparatus for receiving signals containing information about a plurality of velocity profiles of a flow in a pipe and about a pressure gradient of the flow over a length of the pipe; and determining information about an injection of a chemical into the flow in the pipe based at least partly on the information contained in the signals.

12 Claims, 2 Drawing Sheets

Related U.S. Application Data

(60) Provisional application No. 61/209,910, filed on Mar. 11, 2009.

(51) Int. Cl.
  *G05D 24/02* (2006.01)
  *G05D 11/12* (2006.01)
  *G01F 1/66* (2006.01)

(56) References Cited

U.S. PATENT DOCUMENTS

| | | | | |
|---|---|---|---|---|
| 5,645,714 A | * | 7/1997 | Strand | C10G 1/045 |
| | | | | 208/390 |
| 6,378,357 B1 | ‡ | 4/2002 | Han | G01F 1/663 |
| | | | | 73/53.01 |
| 6,778,907 B1 | ‡ | 8/2004 | Washbourne | G01V 1/28 |
| | | | | 702/6 |
| 6,871,148 B2 | * | 3/2005 | Morgen | G01F 1/668 |
| | | | | 702/48 |
| 7,234,524 B2 | ‡ | 6/2007 | Shaw | E21B 41/02 |
| | | | | 166/30 |
| 2003/0056952 A1 | ‡ | 3/2003 | Stegemeier | E21B 43/00 |
| | | | | 166/25 |
| 2006/0020404 A1 | ‡ | 1/2006 | Kishiro | G01F 1/663 |
| | | | | 702/54 |
| 2006/0157282 A1 | ‡ | 7/2006 | Tilton | E21B 4/02 |
| | | | | 175/65 |
| 2007/0181498 A1 | ‡ | 8/2007 | Kaas | B01D 61/022 |
| | | | | 210/64 |
| 2007/0187321 A1 | ‡ | 8/2007 | Bjornson | B03B 9/02 |
| | | | | 210/51 |
| 2008/0017247 A1 | ‡ | 1/2008 | D'Antona | F17D 1/16 |
| | | | | 137/13 |

\* cited by examiner
‡ imported from a related application

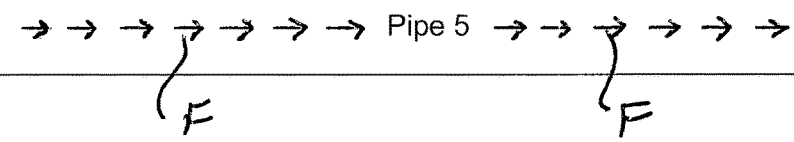

Apparatus, including a system, 10

Data gathering module 12 configured to respond to a flow in a pipe and provide signals containing information about a plurality of velocity profiles of the flow in the pipe and about a pressure gradient of the flow over a length of the pipe Signal processor 14 comprising one or more modules configured to receive the signals containing information about the plurality of velocity profiles of the flow in the pipe and about the pressure gradient of the flow over the length of the pipe, and determine information about an injection of a chemical into the flow in the pipe based at least partly on the information contained in the signals

Figure 1

DETERMINING SHEAR RATE AND/OR SHEAR STRESS FROM SONAR BASED VELOCITY PROFILES AND DIFFERENTIAL PRESSURE

CROSS-REFERENCE TO RELATED APPLICATIONS

This application is a divisional application of, and claims benefit to, parent application Ser. No. 13/255,416, filed 18 Nov. 2011, which corresponds to international patent application serial no. PCT/US2010/026744, filed 10 Mar. 2010, that claims benefit to provisional patent application Ser. No. 61/209,910 (WFMB/CCS nos. 712-2.320//0025P), filed 11 Mar. 2009, which are all incorporated by reference in their entirety.

BACKGROUND OF THE INVENTION

1. Field of Invention

This invention relates to the processing of a flow in a pipe, including a slurry having tailings from a mining operation, such as mature fine tailings (MFT) from oil/sands mining; more particularly, this invention relates to a technique for determining information about an injection of a chemical into the flow in the pipe, including flocculation chemicals, as well as for controlling or regulating the injection of the chemical into the flow in the pipe.

2. Description of Related Art

Tailings are the materials left over after the process of separating the valuable fraction from the worthless fraction of an ore, such as oil sands, copper ore, etc.

In the processing of tailings from a mining operation, such as the processing of mature fine tailings (MFT) in the oil sands mining and separation process, the effectiveness of flocculation chemicals added to a pipe flow of MFT slurry is negatively impacted by (locally) high shear stresses. Flocs are formed by coagulation of particles forming larger aggregates which separate more easily from the carrier fluid. Often it is necessary to add surfactants to overcome repulsive electrostatic forces. Flocs are destroyed by mechanical forces, such as shear forces, breaking the relatively weak induced dipole (Van der Waals) forces.

In complex fluids, such as MFT slurries, the relationship between shear rate and shear stress follows from the generalized Newton equation:

$$\tau = -\eta \frac{\partial v}{\partial r}$$

In this equation the shear rate equals the velocity gradient dv/dr, t is the shear stress and n is the viscosity which may be dependent on the shear rate and or time. Four conceptually different types of rheological behaviour may be present, either in isolation or in combination:
1. Dilatant, where the viscosity increases with increasing rate of shear, often called shear thickening.
2. Pseudoplastic, where the viscosity decreases with increasing rate of shear, often called shear thinning.
3. Thixotropic, where the viscosity decreases with time under a constant rate of shear, often called time thinning.
4. Rheopectic, where the viscosity increases with time under a constant rate of shear, often called time thickening.

In all cases, however the shear stress is dependent on the velocity profile. In the case of a direct proportionality between shear stress and shear rate the fluid is said to be Newtonian.

SUMMARY OF THE INVENTION

The present invention provides a new method and apparatus for processing signals containing information about a plurality of velocity profiles of a flow in a pipe and about a pressure gradient of the flow over a length of the pipe in order to determine information about an injection of a chemical into the flow in the pipe based at least partly on the information contained in the signals.

According to some embodiments, the present invention may be implemented in apparatus and may take the form of a processor, a signal processor, or a signal processor module comprising one or more modules configured to receive the signals containing information about the plurality of velocity profiles of the flow in the pipe and about the pressure gradient of the flow over the length of the pipe, and to determine information about the injection of the chemical into the flow in the pipe based at least partly on the information contained in the signals.

According to some embodiments of the present invention, the flow in the pipe may include a slurry having tailings from a mining operation, including mature fine tailings (MFT) from oil/sands mining, and the injection of the chemical may include flocculation chemicals.

According to some embodiments of the present invention, the one or more modules may be configured to:
determine a zeta profile for a shear rate based at least partly on the information about the plurality of velocity profiles of the flow in the pipe,
determine a Tau profile for a shear stress based at least partly on the information about the pressure gradient of the flow over the length of the pipe, and
determine a viscosity or viscosity profile of the flow in the pipe based at least partly on a ratio of the Tau profile for the shear stress in relation to the zeta profile for the shear rate.

According to some embodiments of the present invention, the one or more modules may be configured to control or regulate the injection of the chemical into the flow in the pipe based at least partly on the viscosity or viscosity profile.

According to some embodiments of the present invention, the plurality of velocity profiles of the flow in the pipe may include a velocity profile of five velocities measured by a velocity profile meter, including a SONAR-based velocity profile meter, where each velocity can be measured in a horizontal plane through an axis of the pipe, where the five velocities can be measured in five different horizontal planes in relation to an axis of the pipe, and/or where at least one velocity profile may be based on a Chebyshev interpolation. The one or more modules may also be configured to use an nth order Chebyshev polynomial, where n is greater than 2, and to invoke a no slip condition, so that the flow velocity at the top and the bottom of the pipe is zero, and the signals includes information about n2 velocity values sampled at points distributed along a vertical axis between the top and bottom.

According to some embodiments, the present invention may be implemented in apparatus taking the form of a system comprising a data gathering module in combination with a processor, a signal processor, or a signal processor module. The data gathering module may comprise one or more modules configured to gather data about the flow in the pipe, including information about the plurality of velocity profiles of the flow in the pipe and about the pressure gradient of the flow over the length of the pipe, and provide the signals containing this information. The data gathering module may include a SONAR-based data gathering module and a differential pressure measuring device, both arranged in relation to the pipe and configured for gathering this data from the flow in the pipe. The processor, signal processor, or signal processor module is configured to respond to the signals and determine the information about the injection of the chemical into the flow in the pipe based at least partly on the information contained in the signals. The system may also include one or more of the other features set forth herein.

According to some embodiments, the present invention may be implemented in a method having one or more of the features set forth above in relation to the processor or system.

According to some embodiments, the present invention may be implemented in apparatus taking the form of a computer-readable storage medium having computer-executable components for performing steps of the aforementioned method, when executed on a signal processor running on a computer device.

According to the present invention, in applications involving MFT processing knowledge of the velocity profile in a pipe flow may be used to enable the controlled, optimum injection rate of surfactants and/or flocculants. A high rate of shear may be advantageous as it leads to increased mixing resulting in rapid dispersion of the surfactant over the pipe area resulting in fast settling. In contrast, high shear stresses, however, may be disadvantageous as it leads to break down of the flocs. Thus, since shear stress and shear rate are related by the equation set forth above, a low viscosity may help to rapidly disperse added chemicals whilst not inducing prohibitively high shear stresses.

Finally, SONAR-based velocity profiling is well positioned to balance shear rate versus shear stress because the SONAR-based velocity profile can be used to infer the shear rate (velocity gradient) whereas the shear stress is (trivially) related to the pressure gradient.

BRIEF DESCRIPTION OF THE DRAWING

The drawing includes FIGS. 1-2, which are not drawn to scale, as follows:

FIG. 1 is a block diagram showing an apparatus, including a system, according to some embodiment of the present invention.

DETAILED DESCRIPTION OF BEST MODE OF THE INVENTION

FIG. 1: The Basic Invention

Figure 2:
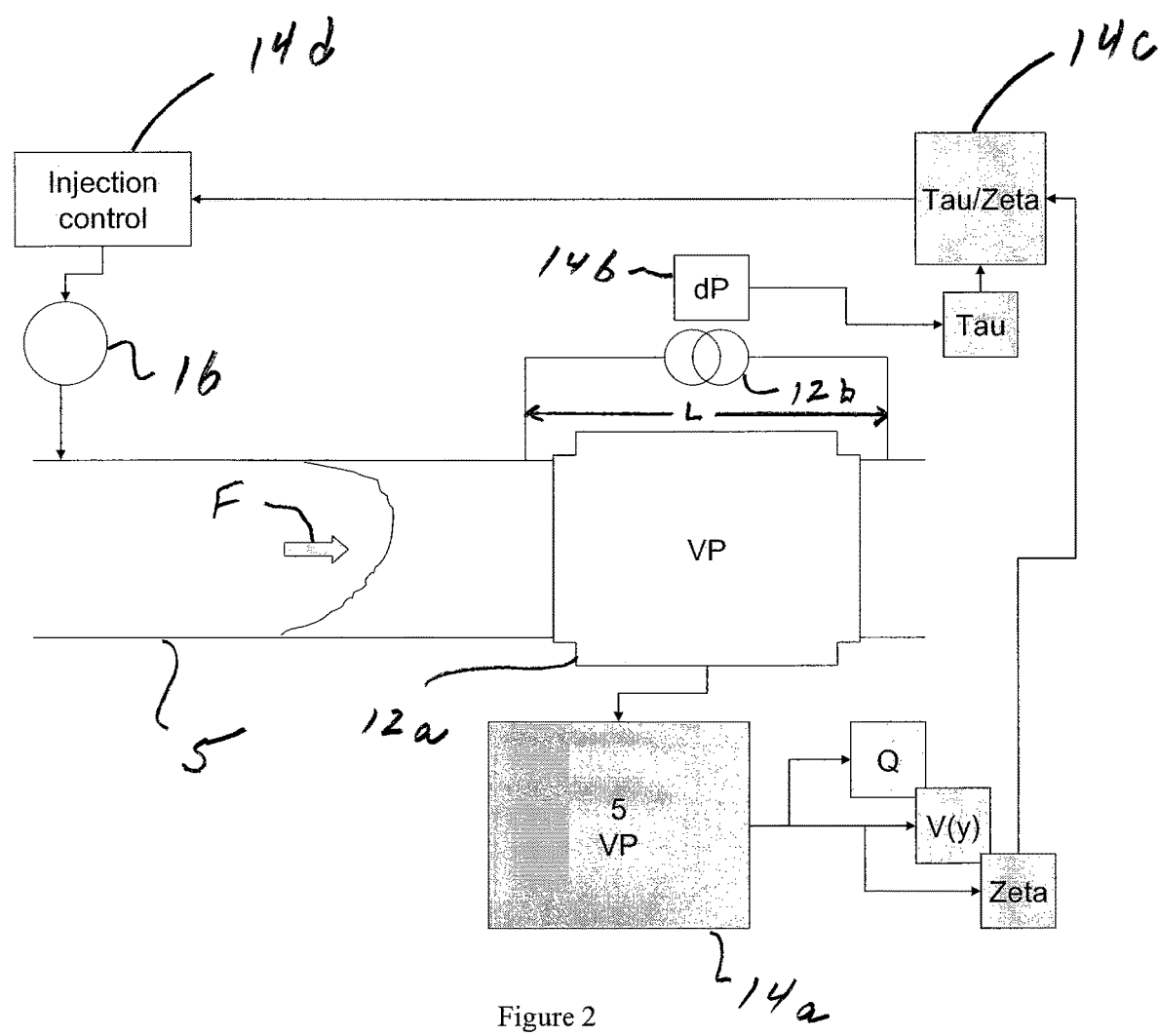
FIG. 2 is a diagram showing the system in FIG. 1 in further detail, by way of example, according to some embodiment of the present invention.

FIG. 1 shows apparatus taking the form of a system generally indicated as 10 according to some embodiments of the present invention, that comprises a data gathering module 12 in combination with a processor, signal processor, or signal processor module 14.

The data gathering module 12 may include one or more modules arranged in relation to a pipe 5 and configured to gather data about the flow F in the pipe 5, including information about a plurality of velocity profiles of the flow F in the pipe 5 and about a pressure gradient of the flow F over a length of the pipe 5, and provide the signals containing this information to the signal processor 14. The data gathering module 12 is known in the art, and may include, e.g., a SONAR-based data gathering module and a differential pressure measuring device arranged in relation to the pipe 5 and configured for gathering this data from the flow F in the pipe 5, as described below in relation to FIG. 2.

The signal processor 14 comprises one or more modules configured to respond to the signals from the data gathering module 12 and determine the information about the injection of the chemical into the flow in the pipe based at least partly on the information contained in the signals. In operation, the one or more modules of the signal processor 14 is configured to determine a zeta profile for a shear rate based at least partly on the information about the plurality of velocity profiles of the flow in the pipe; determine a Tau profile for a shear stress based at least partly on the information about the pressure gradient of the flow over the length of the pipe; determine a viscosity or viscosity profile of the flow in the pipe based at least partly on a ratio of the Tau profile for the shear stress in relation to the zeta profile for the shear rate; and control or regulate the injection of the chemical into the flow in the pipe based at least partly on the viscosity or viscosity profile. By way of example, the flow F in the pipe 5 may include a slurry having tailings from a mining operation, including mature fine tailings (MFT) from oil/sands mining, and the injection of the chemical may include flocculation chemicals.

FIG. 2

FIG. 2 shows the system 10 in FIG. 1 in further detail according to some embodiments of the present invention. For example, the system 10 is one example of a control system for chemical injection that includes data gathering modules such as a velocity profile (VP) meter 12a and a differential pressure (dP) meter 12b, that includes signal processing modules such as a 5 velocity profile module 14a, a differential pressure module 14b, a Tau/Zeta module 14c, an injection control module 14d, and that also includes a chemical injector 16.

The VP meter 12a is configured to gather data about the flow F in the pipe 5, including measuring 5 velocities, and provides the data to the 5 velocity profile module 14a. The 5 velocity profile module 14a processes the 5 measured velocities, and provides 3 independent output signals, including:

1) A zeta profile signal (Zeta) containing information about a shear rate.
2) A velocity profile signal (V(y)) itself.
3) A volumetric flowrate (profile) signal (Q).

A person skilled in the art would appreciate how to process measured velocities into the 3 independent output signals using techniques that are known in the art, and the scope of the invention is not intended to be limited to any particular type, kind or manner of doing so either now known or later developed in the future. Although the embodiment is described, by way of example, as using 5 measured velocity profiles, the scope of the invention is intended to including using more or less than 5 measured velocity profiles.

The dP meter 12b is configured to also gather data about the flow F in the pipe 5, including measuring a pressure gradient over a length L of the pipe 5, and provide a measured pressure gradient signal to the differential pressure module 14b. The differential pressure module 14b processes the measured pressure gradient signal, and provides a shear stress profile signal (Tau) based at least partly on the measured pressure gradient signal. A person skilled in the art would appreciate how to process the measured pressure gradient signal and provides the shear stress profile signal (Tau) based at least partly on the measured pressure gradient signal using techniques that are known in the art; and the scope of the invention is not intended to be limited to any particular type, kind or manner of doing so either now known or later developed in the future.

The Tau/Zeta module 14c receives the zeta profile signal (Zeta) and the shear stress profile signal (Tau), processes the same, and provides a viscosity (profile) signal based at least partly on a ratio of shear stress to zeta. A person skilled in the art would appreciate how to process the zeta profile signal (Zeta) and the shear stress profile signal (Tau) and provides the viscosity (profile) signal based at least partly on the ratio of shear stress to zeta using techniques that are known in the art; and the scope of the invention is not intended to be limited to any particular type, kind or manner of doing so either now known or later developed in the future.

The injection control loop module 14d receives the viscosity (profile) signal, and uses it in a control loop to regulate the injection of chemical into the flow F in the pipe 5 by the chemical injector 16. A person skilled in the art would appreciate how to process the viscosity (profile) signal and uses it in the control loop to regulate the injection of chemical into the flow F in the pipe 5 using techniques that are known in the art; and the scope of the invention is not intended to be limited to any particular type, kind or manner of doing so either now known or later developed in the future. The chemical injector 16 is known in the art, and the scope of the invention is not intended to be limited to any particular type or kind either now known or later developed in the future.

Velocity Profiling and Shear Rate

The velocity profile meter 12a is known in the art and may take the form of a SONAR-based, as described below. In operation, velocity profile meter 12a provides multiple flow velocity measurements in a vertical plane through the pipe axis (e.g., velocities in five different vertical planes). Additionally, by invoking the no slip condition, the flow velocity at the top and bottom of the pipe must be zero. This results in a total of 7 known velocity values, two of which are always zero.

A polynomial interpolation based on these 7 values can be used to resample at points distributed along a vertical axis at will, for instance at the nodes of a $7^{th}$ order Chebyshev polynomial. Thus a velocity profile based on a Chebyshev interpolation results which directly gives the velocity gradient (shear rate) and, by integration the volumetric rate of flow.

A distinctive advantage of using an interpolation based on Chebyshev polynomials is the fact that the Chebyshev polynomials are orthogonal and the resulting interpolation is thus given in terms of coefficients of the interpolating polynomial, its derivative and its primitive. Having the coefficients available allows filtering those coefficients by a linear time domain based, first order filter to dampen noise and to filter the higher order coefficients, describing the details of the profile, more heavily than the lower order coefficients.

After filtering, the velocity profile is forced to obey the no slip condition at the wall by adjusting the appropriate coefficient until zero velocity at the pipe wall is maintained. Without such filtering and adjusting the calculated velocity profile would be very noise and of little use. A derived shear rate profile would be even noisier. The shear rate is denoted by the letter zeta:

$$\zeta = \frac{\partial v}{\partial r}$$

This shear rate profile is a direct, independent output of the velocity profile meter. It is given as a power series in Chebyshev polynomials.

Differential Pressure and Shear Stress

A differential pressure measurement over a certain length of pipe allows the calculation of the (average) pressure gradient. The pressure gradient in any type of pipe flow is related to the shear stress profile by a momentum balance resulting in:

$$2\frac{\tau}{r} = \frac{dp}{dx}$$

As a result, the shear stress profile in any pipe flow can be seen to vary linearly with the pipe radius, independent of the viscosity or velocity profile. Instead, if the viscosity were known the above equation is the basis for the derivation of a velocity profile. For instance 'plug' flow behaviour follows from the above by choosing a viscosity model following the behaviour of Bingham fluids.

The Data Gathering Meters and Modules 12a, 12b and Associated Data Gathering or Sensing Technology By way of example, the data gathering meters or module 12a, 12b may include a SONAR-based data gathering module and a differential pressure measuring device arranged in relation to the pipe 5 and configured for gathering this data from the flow F in the pipe 5. The data gathering meters or module 12a, 12b and associated data gathering or sensing technology are known in the art, and the scope of the invention is not intended to be limited to any particular type or kind thereof either now known or later developed in the future. By way of example, the associated data gathering or sensing technology may include the GH-100 and/or GVF-100 meter developed by the assignee of the instant patent application. The associated data gathering or sensing technology may also include in whole or in part devices disclosed in U.S. Pat. Nos. 7,165,464; 7,134,320; 7,363,800; 7,367,240; and 7,343,820, which are all incorporated by reference in their entirety. The sensing technology disclosed in these cited patents may also be referred to herein as SONAR-based sensing technology, which was developed be the assignee of the present invention. The scope of the invention is also intended to include using other types or kind of apparatus, device, systems etc. for SONAR-based data gathering and differential pressure measuring either now known or later developed in the future.

The Signal Processing Modules 14, 14a, 14b, 14c or 14d

Signal processing technology is known and available in the art for implementing the functionality of the modules 14, 14a, 14b, 14c, or 14d. By way of example, the functionality of the signal processor modules 14, 14a, 14b, 14c, or 14d, may be implemented using hardware, software, firmware, or a combination thereof. In a typical software implementation, the processor modules would include one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular type or kind of signal processing technology either now known or later developed in the future, and embodiments are envisioned using other types or kinds of signal processing technology either now known or later developed in the future.

The scope of the invention is intended to include the signal processor being a stand alone component or module, as well as the signal processor forming part a combined SONAR-based meter and signal processing device.

The one or more modules may also be implemented as apparatus taking the form of a computer-readable storage medium having computer-executable components for performing the steps of the aforementioned method.

Alternative Embodiment

Alternatively, embodiments are also envisioned in which, in case the velocity profile (zeta) is not available, viscosity (eta) can be derived using a combination of flow rate (Q) and differential pressure (dP). This method can use the Rabinowitsch equation from 1924. A control method based on the Rabinowitsch equation may be applied to any combination of gross volumetric flow rate and differential pressure. The scope of the invention is intended to include such as alternative embodiment.

Applications

Although the scope of the invention is described in relation to the processing of a slurry having tailings from a mining operation, such as mature fine tailings (MFT) from oil/sands mining, the scope of the invention is intended to include applications or processes for other type or kinds of pipe flows, including those where chemical need to be provided to such pipe flows. For example, the applications may include other types or kind of pipe flows either now known or later developed in the future, including other types or kind of industrial processes either now known or later developed in the future.

THE SCOPE OF THE INVENTION

While the invention has been described with reference to an exemplary embodiment, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. An apparatus for controlling an injection of a chemical into a slurry in a pipe in a mining operation, comprising:
  a signal processor or processing module having one or more modules configured to:
    receive signals containing information about a rate of a flow of a slurry having mature fine tailings (MFT) in a pipe and about a Tau profile of a shear stress related to a differential pressure gradient of the flow over a length of the pipe; and
    determine control signals containing information about an injection of a chemical into the flow in the pipe based at least partly on the information contained in the signals received.

2. An apparatus according to claim 1, wherein the mining operation includes an oil/sands mining operation.

3. An apparatus according to claim 1, wherein the injection of the chemical includes flocculation chemicals.

4. Apparatus according to claim 1, wherein the apparatus comprises
  a differential pressure meter configured to respond to the flow of the slurry having the mature fine tailings (MFT) in the pipe and provide differential pressure meter signals containing the differential pressure gradient of the flow over the length of the pipe; and
  a tau module configured to receive the differential pressure meter signals, and provide Tau profile signals containing information about pet gthe Tau profile of the shear stress related to the differential pressure gradient of the flow over the length of the pipe.

5. An apparatus according to claim 1, wherein the one or more modules is configured to derive a viscosity or viscosity profile based at least partly on the rate of the flow and the differential pressure gradient.

6. An apparatus according to claim 5, wherein the one or more modules is configured to provide the control signals for controlling or regulating the injection of the chemical into the flow in the pipe based at least partly on the viscosity or viscosity profile.

7. A system for controlling an injection of a chemical into a slurry in a pipe in a mining operation, comprising:
  a data gathering module configured to respond to a flow of a slurry having mature fine tailings (MFT) in a pipe and provide signals containing information about a rate of the flow in the pipe and about a Tau profile of a shear stress related to a differential pressure gradient of the flow over a length of the pipe; and
  a signal processor comprising one or more modules configured to receive the signals, and determine control signals containing information about an injection of a chemical into the flow in the pipe based at least partly on the information contained in the signals received.

8. A system according to claim 7, wherein the mining operation includes an oil/sands mining operation.

9. A system according to claim 7, wherein the injection of the chemical includes flocculation chemicals.

10. A system according to claim 7, wherein
  the data gathering module comprises a differential pressure meter configured to respond to the flow of the slurry having the mature fine tailings (MFT) in the pipe and provide differential pressure meter signals containing the differential pressure gradient of the flow over the length of the pipe; and the system comprises a tau module configured to receive the differential pressure meter signals, and provide Tau profile signals containing information about the Tau profile of the shear stress related to the differential pressure gradient of the flow over the length of the pipe.

11. A system according to claim 7, wherein the one or more modules is configured to derive a viscosity or viscosity profile based at least partly on the rate of the flow and the differential pressure gradient.

12. A system according to claim 11, wherein the signal processor is configured to provide the control signals to control or regulate the injection of the chemical into the flow in the pipe based at least partly on the viscosity or viscosity profile.

\* \* \* \* \*